No. 636,349. Patented Nov. 7, 1899.
F. M. McCARTEA.
NUT LOCK.
(Application filed Jan. 7, 1899.)

(No Model.)

Witnesses
J. C. Shaw
Chas. D. Brock

Inventor
F. M. McCartea,
by O'Meara & Co.
Attorneys

THE NORRIS PETERS CO., PHOTO-LITHO., WASHINGTON, D. C.

UNITED STATES PATENT OFFICE.

FRANCIS M. McCARTEA, OF SAN JUAN, CALIFORNIA.

NUT-LOCK.

SPECIFICATION forming part of Letters Patent No. 636,349, dated November 7, 1899.

Application filed January 7, 1899. Serial No. 701,520. (No model.)

*To all whom it may concern:*

Be it known that I, FRANCIS M. McCARTEA, a citizen of the United States, residing at San Juan, in the county of San Benito and State of California, have invented a new and useful Nut-Lock, of which the following is a specification.

This invention relates generally to nut-locks or means for preventing a nut from working loose upon the bolt.

The object of the invention is to provide an exceedingly cheap and simple device which is adapted for use upon wooden structures or iron structures, and it is especially adapted for use upon vehicles.

With this object in view my invention consists, essentially, in providing a cylindrical receiving socket or receptacle, into which fits the nut or a portion thereof and having ratchet-teeth cut upon the portion entering said socket, a stout spring encircling the socket and provided with a tooth or pawl extending into the said socket for the purpose of engaging the ratchet-faced notches of the nut, thereby securely locking the nut within the socket, said socket of course being rigidly secured to the structure upon which it is intended to use the nut.

My invention consists also in certain details of construction and novelties of combination, all of which will be fully described hereinafter and pointed out in the claims.

Figure 1:
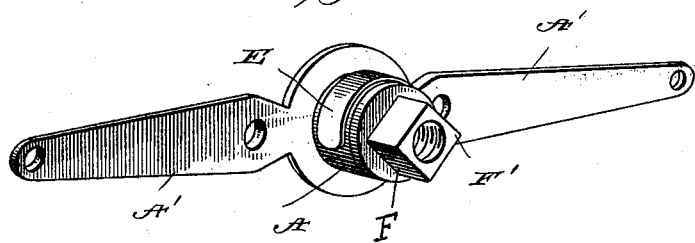
Figure 2:
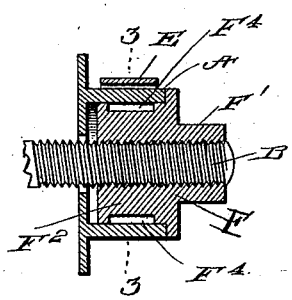
Figure 3:
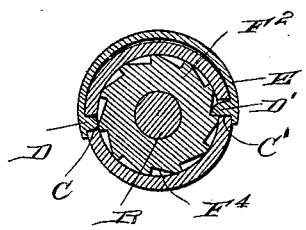
Figure 4:
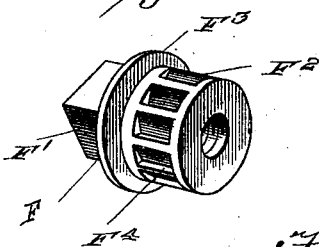
Figure 5:
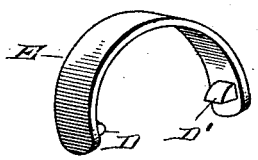
Figure 6:
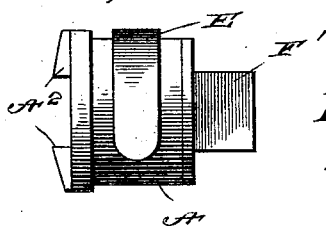

In the drawings forming part of this specification, Figure 1 is a view showing the practical application of my invention, the device being constructed for use upon woodwork, such as vehicles or bridges. Fig. 2 is a detail sectional view of the nut, socket, and spring. Fig. 3 is a section on the line 3 3 of Fig. 2. Fig. 4 is a perspective view of the nut. Fig. 5 is a perspective view of the locking-spring and teeth. Fig. 6 is a view of the device complete adapted for use upon metal structures.

In carrying out my invention I employ a socket or receiving-receptacle A, which is constructed with flanges or plates A', adapted to be secured to any character of woodwork upon which the bolt or nut is to be used. When the socket is to be used upon metal-work, such as railroad-rails and the like, ribs $A^2$ are formed upon the under side of the socket, which ribs are adapted to engage notches or recesses cut in the base or fish plate, thereby preventing the socket from turning. The bottom of the socket has a central opening, through which the bolt B passes, and at diametrical points are produced openings C and C', through which the pin D and the tooth or pawl D' project, said tooth or pawl being carried upon one end of the spring E, essentially semicircular in shape and embracing one side of the socket A, the pin or stud D being arranged upon the opposite end and fitting in the opening C to hold the spring in place. The nut F is formed with a polygonal-shaped outer portion F' and a cylindrical-shaped inner portion $F^2$, said portions being separated by means of an annular flange $F^3$. The cylindrical portion $F^2$, which enters the socket, has a series of ratchet-faced notches or recesses $F^4$ cut therein, which notches or recesses are adapted to be engaged by the tooth or pawl D', thereby securing the locking of the nut within the socket, which is made fast, as previously described. The ratchet-tooth D' and the ratchet-faced notches $F^4$ are so arranged with reference to each other that the nut can be screwed upon the bolt and into the socket, but cannot be removed, and whenever it becomes necessary to remove the nut the tooth D' must be forced out of engagement with the ratchet-faced notches of the nut by means of any suitable tool. As soon as this is done the nut can be unscrewed the same as usual.

It will thus be seen that I provide an exceedingly cheap, simple, and efficient construction of nut-lock capable of use in connection with both wooden and iron structures and one which will not get out of order and one which is not likely to be tampered with.

Having thus fully described my invention, what I claim as new, and desire to secure by Letters Patent of the United States, is—

1. A nut-lock comprising a socket provided with means to prevent rotation, a semicircular spring embracing the exterior of the socket and provided with a tooth or pawl projecting through the side of the socket into the interior, and a nut adapted to fit within the socket and having a series of ratchet-faced notches or recesses adapted to be engaged by the tooth or pawl carried by the spring, substantially as described.

2. In a nut-lock, the combination with the socket having flanges or plates integral therewith, a nut having a portion thereof shaped to fit within the socket, said portion having a series of ratchet-faced notches and a substantially semicircular spring adapted to embrace the exterior of the socket and having a pin arranged at one end of the spring and a tooth arranged at the opposite end of the spring and adapted to pass through an opening in the socket and engage the ratchet-faced notches of the nut, substantially as shown and described.

3. In a nut-lock, the combination with a socket, a nut having a reduced portion to fit in said socket, a series of ratchet-faced notches or recesses arranged around said reduced portion, a locking device consisting of a semicircular flat strip of spring metal having a lug on one end and adapted to engage an opening in said casing, and a tooth on the other end also adapted to enter an opening in the casing and engage the ratchet-teeth of the nut diametrically opposite the first-named opening substantially as described.

FRANCIS M. McCARTEA.

Witnesses:
JAS. G. PIRATSKY,
JOHN BULENS.